United States Patent [19]

Kato et al.

[11] Patent Number: 4,502,143
[45] Date of Patent: Feb. 26, 1985

[54] CONSECUTIVE IDENTICAL DIGIT SUPPRESSION SYSTEM IN A DIGITAL COMMUNICATION SYSTEM

[75] Inventors: Masami Kato, Tokyo; Noriaki Yoshikai, Yokosuka, both of Japan

[73] Assignee: Nippon Telegraph & Telephone Public Corporation, Tokyo, Japan

[21] Appl. No.: 369,838

[22] Filed: Apr. 19, 1982

[30] Foreign Application Priority Data

| Apr. 20, 1981 | [JP] | Japan | 56-59944 |
| Dec. 25, 1981 | [JP] | Japan | 56-209103 |
| Dec. 28, 1981 | [JP] | Japan | 56-209993 |
| Dec. 28, 1981 | [JP] | Japan | 56-209994 |

[51] Int. Cl.³ .............................................. H03K 5/26
[52] U.S. Cl. ........................................ 371/57; 375/22; 455/608
[58] Field of Search .................. 371/57; 455/608; 375/22, 19, 23, 55, 37; 178/69 D; 358/260, 261

[56] References Cited

U.S. PATENT DOCUMENTS

| 4,034,406 | 7/1977 | Tsuchiya et al. | 358/260 |
| 4,131,915 | 12/1978 | Nakagome et al. | 358/260 |
| 4,161,719 | 7/1979 | Porikh et al. | 371/57 |
| 4,189,621 | 2/1980 | Scott et al. | 375/23 |
| 4,262,309 | 4/1981 | Yamaguchi et al. | 358/260 |
| 4,347,617 | 8/1982 | Murano et al. | 455/608 |

OTHER PUBLICATIONS

Hiroyuki Kasai et al., "PCM Jitter Suppression by Scrambling", IEEE Transactions on Communications, vol. COM-22, No. 8, Aug. 1974.

Primary Examiner—Jerry Smith
Assistant Examiner—Michael R. Fleming
Attorney, Agent, or Firm—Ratner & Prestia

[57] ABSTRACT

An encoder for suppression of a consecutive identical digit in a digital transmission system has been found for facilitating the reproduction of a clock signal for regenerating reception data, and keeping the average signal level constant. According to the present invention, a single bit (x) is inserted for every predetermined number (m) of input digits, and said insertion bit is a complement of a digit of previous k bits where k is an integer satisfying $1 \leq k \leq m$. Preferably, the value k is 1. The present invention is useful for digital communication higher than 100 Mbits/second, in particular, in optical communication.

9 Claims, 19 Drawing Figures

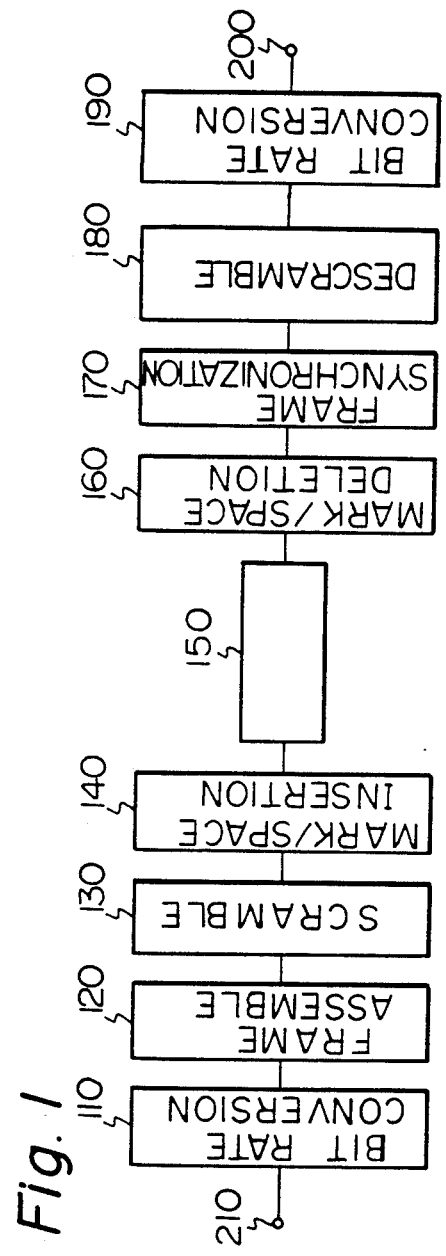
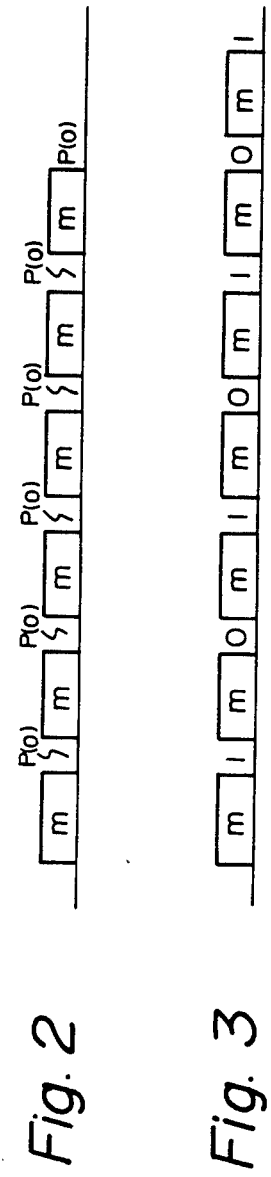
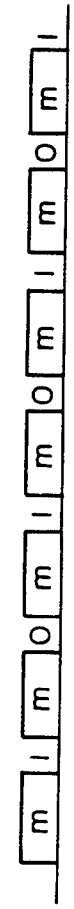
Fig. 1
Fig. 2
Fig. 3

Fig. 6
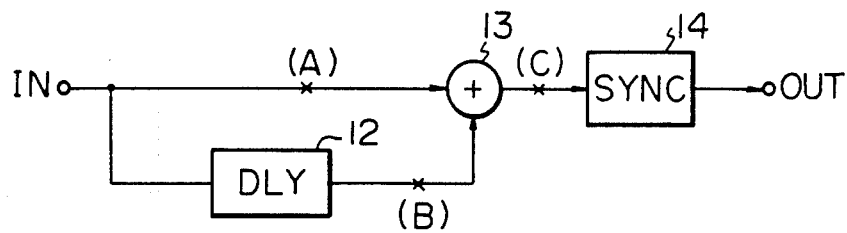
Fig. 7
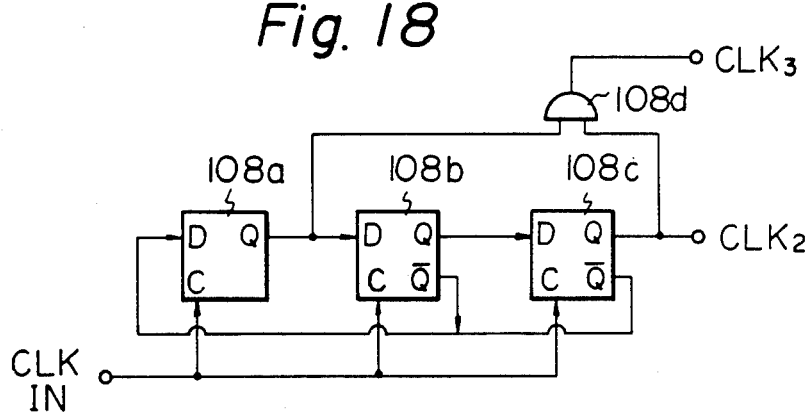
Fig. 18

Fig. 11B

| | $Q_1$ | $Q_2$ | $Q_3$ | $Q_4$ | $Q_5$ | $Q_6$ | OUT |
|---|---|---|---|---|---|---|---|
| $t_0$ | 0 | 0 | 0 | 0 | 0 | 0 | 0 |
| $t_1$ | 1 | 0 | 0 | 0 | 0 | 0 | 0 |
| | 1 | 1 | 0 | 0 | 0 | 0 | 0 |
| | 1 | 1 | 1 | 0 | 0 | 0 | 0 |
| | 1 | 1 | 1 | 1 | 0 | 0 | 0 |
| | 1 | 1 | 1 | 1 | 1 | 0 | 0 |
| | 1 | 1 | 1 | 1 | 1 | 1 | 1 |
| | 0 | 1 | 1 | 1 | 1 | 1 | 0 |
| | 0 | 0 | 1 | 1 | 1 | 1 | 0 |
| | 0 | 0 | 0 | 1 | 1 | 1 | 0 |
| | 0 | 0 | 0 | 0 | 1 | 1 | 0 |
| | 0 | 0 | 0 | 0 | 0 | 1 | 0 |
| | 1 | 0 | 0 | 0 | 0 | 0 | 0 |
| | 1 | 1 | 0 | 0 | 0 | 0 | 0 |

1 PERIOD

CONSECUTIVE IDENTICAL DIGIT SUPPRESSION SYSTEM IN A DIGITAL COMMUNICATION SYSTEM

BACKGROUND OF THE INVENTION

The present invention relates to a consecutive identical digit supression system, in particular relates to such a system for the use in a digital transmission system in an optical fiber communications system.

In a digital transmission system, a consecutive identical digit (consecutive identical marks, or spaces) are not desirable, because (1) a clock timing for regenerating a symbol is not kept correctly in a long consecutive identical digit condition, and (2) the level of a signal fluctuates depending upon the information to be transmitted. Thus, the consecutive identical digit deteriorates the transmission quality and generates undesirable transmission errors.

Accordingly, a pair of code conversion circuits (encoder an decoder) have been utilized in a digital transmission system to prevent too many consecutive identical digits.

FIG. 1 is the typical block diagram of a digital transmission system, in which the reference numeral 210 is a data input terminal, 110 is a transmission speed conversion circuit, 120 is a frame assembler, 130 is a scrambler, 140 is a code converter or a consecutive identical digit suppression circuit, 150 is a transmission line, 160 is a code disassembler for disassembling the code for reproducing the signal which is assembled by the code converter 140, 170 is a frame synchronization circuit, 180 is a disscrambler which reproduces the signal which is scrambled by the scrambler 130, 190 is a bit rate conversion circuit for reproducing the signal converted by the circuit 110, and 200 is an output terminal for providing output data.

Tne scrambler 130 and the disscrambler 180 provide the balanced code in which the possibility of the code "1" and the possibility of the code "0" become similar during a long duration. The scrambler and the disscrambler are described in the article "PCM Jitter Suppression by Scrambling" by H. Kasai et al in IEEE Transactions on communications, vol. COM-22, No. 8, August 1974, pages 1114-1122.

However, the scrambler and/or the disscrambler can provide only the possibility that the consecutive identical digit is less than the predetermined value. Therefore, the length of the consecutive identical digit of the output of the scrambler depends upon the input data, and the scrambler can not guarantee that the maximum length of the consecutive identical digit is less than the desired value. Thus, a code converter 140 is introduced in order to guarantee that the length of the consecutive identical digit does not exceed a predetermined value, and provide a BSI (Bit Sequence Independence) signal.

One of prior code converters 140 is a block conversion system, in which a block with m number of bits is converted to a block with n number of bits. For instance, in 3B4B code in which a block with 3 bits is converted to a block 4 bits, and a typical conversion algorithm for that conversion determines the sign of the fourth bit so that the number of "1" digits in each block (four bits) is 2 for input codes 001 through 110, an input code "000" is coded to "0100" and "1011" alternately, and an input code "111" is coded to "0010" and "1101" alternately. Therefore, the following relations are satisfied between an input 3 bit code and an output 4 bit code.

| Input | Output |
|-------|--------|
| 000 | 0100 or 1011 |
| 001 | 0011 |
| 010 | 0101 |
| 011 | 0110 |
| 100 | 1001 |
| 101 | 1010 |
| 110 | 1100 |
| 111 | 0010 or 1101 |

However, that mBnB code has the disadvantage that the number of transmission error is increased through an encoding and decoding. For instance, it is assumed that an original code is "001" in the above table. The original code is encoded to "0011", which is transmitted into a transmission line. Then, it is assumed that the code "0011" is changed to "0010" due to a transmission error by a noise (the fourth bit is in error). The receive side decodes the code "0010" to the code "111" according to the above table. As a result, the original code "001" is reproduced as "111". It should be appreciated in the above procedure that a single transmission error causes two bits of error in a receive side, and the number of errors in a transmission line is increased through an encoding and decoding procedure. Of course, that increase of errors is not desirable.

Another block conversion system is the CMI (Coded Mark Inversion), which is described in the U.S. Pat. No. 4,189,621. In the CMI system, when the input data is "1", the output data is "11" or "00", which appears alternately, and when the input data is "0", the output data is "10". Thus, according to the CMI system, the length of the consecutive identical digit (consecutive identical "1" or "0") is 3.

However, the CMI system has the disadvantage that the pulse repetition frequency or the transmission speed of the encoded signal is twice as high as that of the input signal, since each input bit generates two output bits.

Other block conversion systems are the DMI (Differential Mode Inversion) and the Dipulse system. In the DMI system, a mode is switched by every input data "1", and in the first mode, the input data "1" is converted to "11" and the input data "0" is converted to "01", while in the second mode, the input data "1" is converted to "00" and the input data "0" is converted to "10". In the Dipulse system, each input data "1" is converted to "10" and each input data "0" is converted to "01". However, both the DMI system, and the Dipulse system have the disadvantage that the output frequency or the transmission speed is much higher than that of the input signal, since a number of pulses for each of the data is increased through the conversion. As those systems raise the transmission speed considerably, those systems can both be used in a high speed digital transmission system which is higher than 100 Mbits/second.

Another prior code converter system is a bit insertion code system, in which mB1P (m Binary with 1 Parity) and PMSI (Periodic Mark Space Insertion) are typical ones.

In the mB1P system, an odd parity bit P(o) is inserted for each m bits of input data (see FIG. 2). In the mB1P system, the maximum number of the consecutive identical digit is 2m, and that length 2m is not short enough for high speed data transmission.

Another prior system, PMSI, inserts "1" and "0" alternately periodically for every m bits of input data (see FIG. 3). In the PMSI system, the maximum number of the consecutive identical digit is 2m+1, which is also not short enough for high speed data transmission. Further, in the PMSI system, a line spectrum is generated in a signal spectrum since a data "1" and "0" is inserted periodically, and that line spectrum would cause a jitter and deteriorates the margin for interference.

As described above, a prior consecutive identical digit suppression system is not suitable for a high speed latest digital transmission system, in which the transmission bit rate is higher then 100 Mbits/second, and the desirable maximum number of the consecutive identical digit is less than 12.

Some of the desirable natures of a consecutive identical digit suppression system are:

(1) the maximum number of the consecutive identical digit is short, and is preferably less than 12.

(2) the output frequency or the transmission speed is not so high as compared with that of the input signal.

(3) The high bit rate conversion for higher than 100 Mbits/second is possible. For the high bit rate conversion, a conversion circuit must be simple.

(4) An error in a transmission line is not increased through encoding the decoding procedure.

SUMMARY OF THE INVENTION

It is an object of the present invention to overcome the disadvantages and limitations of a prior suppression system by providing a new and improved consecutive identical digit suppression system.

It is also an object of the present invention to provide an improved suppression system in which (1) the maximum consecutive identical digit length can be short enough, (2) the transmission bit rate of a signal does not increase so much, (3) an encoder circuit structure is simple, and (4) a transmission error is not increased through the decoding procedure.

The above and other objects are attained by a consecutive identical digit suppression system in a digital communication having an input terminal for receiving an input signal, means for converting transmission bit rate of an input signal to (m+1)/m times of that of an input signal where m is an integer, means for inserting an additional complement bit of previous k bits of an insertion bit for every m input bits, and an output terminal for providing an encoded signal with m bits of input signal and one additional complement bit.

Preferably, said value k is 1, and preferably, said value m is less than 12.

BRIEF DESCRIPTION OF THE DRAWINGS

The foregoing and other objects, features, and attendant advantages of the present invention will be appreciated as the same become better understood by means of the following description and accompanying drawings wherein:

FIG. 1 shows a block diagram of a general communication system which utilizes a maximum consecutive identical digit suppression system, FIG. 2 shows the signal sequence in a prior maximum consecutive identical digit suppression system, FIG. 3 shows another prior signal sequence in a prior maximum consecutive identical digit suppression system, FIG. 6 is a block diagram of a synchronizer in a receiver for decoding the encoded signal, FIG. 7 shows the signal sequence for the explanation of the operation of the circuit of FIG. 6, FIG. 11B shows the operational time chart of the circuit of FIG. 11A, FIG. 18 is a detailed block diagram of the frequency divider in FIG. 17.

DESCRIPTION OF THE PREFERRED EMBODIMENTS

Figure 4:
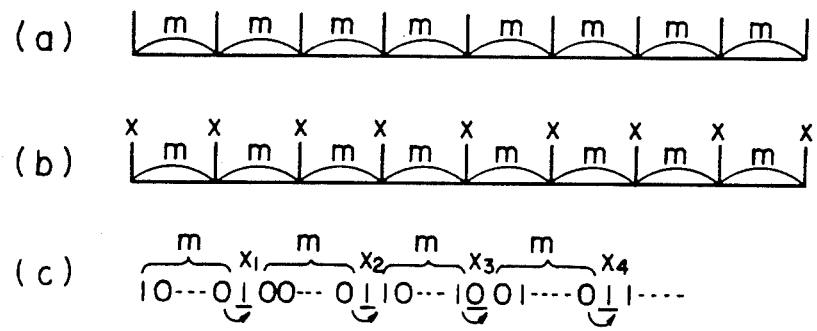
FIG. 4 shows the signal sequence according to the present maximum consecutive identical digit suppression system.

FIG. 4 is the explanatory drawing of the present invention. According to the present invention, a bit position in which an additional bit is inserted is provided for every m number of input bits, where m is an integer (see FIG. 4(a)), and in that position, an insertion pulse (x) is inserted as shown in FIG. 4(b). The insertion pulse (x) is determined so that the sign of the insertion pulse (x) is the complement of the sign of the previous one bit of the insertion pulse (x). As shown in FIG. 4(c), when the preceeding bit is "0", the insertion pulse (x) is "1" (see $x_1$, $x_2$ and $x_4$ in FIG. 4(c)), and when the preceeding bit is "1", the insertion pulse (x) is "0" (see $x_3$ in FIG. 4(c)).

In the embodiment of FIG. 4, the maximum number of the consecutive identical digit is m+1, which occurs when the insertion bit (x) and the succeeding m number of bits are identical. The bit rate increase ratio of the embodiment of FIG. 4 is only (m+1)/m, since m input bits are converted to m+1 number of output bits. Further, no line spectrum is generated in the embodiment of FIG. 4 since an insertion pulse (x) is not fixed to "0" or "1". Of course, the embodiment of FIG. 4 does not increase a transmission error during encoding and decoding procedure.

Figure 5:
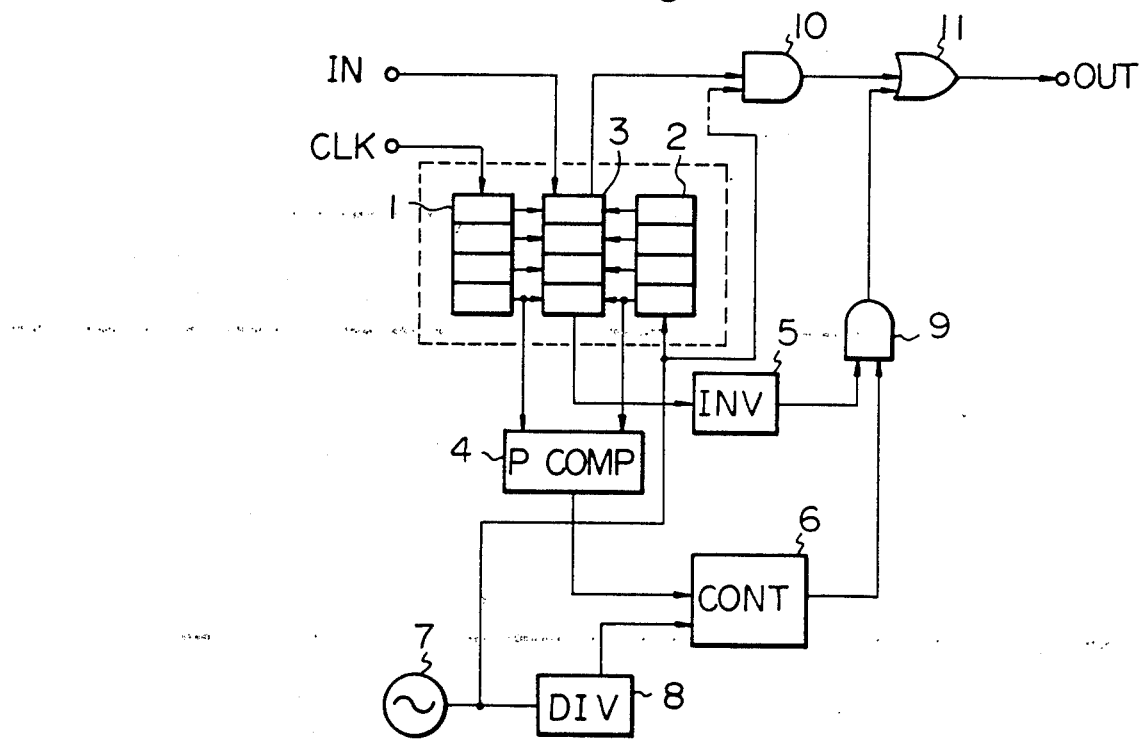
FIG. 5 is a block diagram of an encoder for performing the present maximum consecutive identical digit suppression system of FIG. 4.

FIG. 5 is a block diagram of the circuit for implementing the code conversion of FIG. 4. In FIG. 5, the symbol IN is a first input terminal for receiving an input signal, CLK is a second input terminal for receiving a clock timing signal which has the same speed as that of the input signal, OUT is an output terminal for providing encoded output data, 1 and 2 are ring counters, 3 is a memory. The members 1, 2, and 3 which are enclosed by a dotted line compose a bit rate converter. The reference numeral 4 is a phase comparator, 5 is an inverter, 6 is a pulse insertion control circuit, 7 is an oscillator which provides the frequency of $(m+1)/m$ times of that of the clock signal, 8 is a divider for providing an output pulse for every $m+1$ pulses of that oscillator 7, 9 and 10 are AND circuits, and 11 is an OR circuit.

Input data at the input terminal IN is stored temporarily in the memory 3 according to the clock pulse at the terminal CLK. The address of the memory 3 for storing the input data is designated by the first ring counter 1. The oscillator 7 generates the frequency which is $(m+1)/m$ times of the clock frequency at the terminal CLK, and the output of that oscillator 7 is applied to the second ring counter 2 for designating the address of the memory 3 in reading out the same. Then, the data stored in the memory 3 is read out according to the frequency of the oscillator 7 to provide a bit rate conversion. The phase comparator 4 compares the phase of the CLK pulse and the phase of the oscillator 7, and provides the in-phase output signal for every $m+1$ pulses of the oscillator output. On the other hand, the divider 8 provides the output pulse for $m+1$ oscillator pulse. The pulse insertion control circuit 6 provides the output pulse when both the phase comparator 4 and the divider 8 provide an output pulse. The output pulse of the pulse insertion control circuit 6 defines the bit position that an insertion pulse is inserted. The ring counter 1 indicates every m'th bit in the memory 3, and code of that m'th bit read out of the memory 3 is inverted by the inverter 5. Thus, the inverter 5 provides the complement of the sign of every m'th bit. The AND circuit 9 provides the logical product of the output of the inverter 5 and the output of the pulse insertion control circuit 6. The output of the AND circuit 9 is inserted in the original data by the OR circuit 11, which receives m number of bits with the converted transmission bit rate $((m+1)/m)$ from the AND circuit 10 and the pulse to be inserted for every m bits from the AND circuit 9. The output of the OR circuit 11 provides the pulse train as shown in FIG. 4(c) to the output terminal OUT.

FIG. 6 is a block diagram of a synchronization circuit for decoding the signal which is coded by the coder of FIG. 5. In FIG. 6, the reference numeral 12 is a delay circuit for providing a delay time equal to one bit interval, 13 is an adder which is implemented by an exclusive-OR circuit, and 14 is a synchronization circuit, IN is an input terminal and OUT is an output terminal. FIG. 7 shows the operation of the circuit of FIG. 6, and FIG. 7(a) shows the pulse train at the point (A) of FIG. 6, FIG. 7(b) shows the pulse train at the point (B) of FIG. 6, and FIG. 7(c) shows the pulse train at the point (C) of FIG. 6. Since the bit (x) is the complement of the sign of the previous one bit of the same, the exclusive-OR circuit 13 which receives the input data itself and the output of the one bit interval delay circuit 12 provides the output "1" which the period equal to the inserted bit (x) as shown in FIG. 7(c). A pulse train of FIG. 7(c) indicates the position of the inserted pulse, which facilitates the synchronization of a reception signal for regenerating reception signal.

Although the above embodiment discloses the insertion bit (x) which is the complement of the previous one bit, that insertion bit (x) may be a complement of the sign of the previous k bits (k is an integer larger than 1 and equal to or less than m) of that insertion bit. In that case, the maximum number of the consecutive identical digit is $m+2$ when the insertion bit (x) is the complement of the previous two bits, or that number is $m+3$ when the insertion bit is the complement of the previous three bits, or that number is $m+4$ when the insertion bit is the complement of the previous four bits. As that length is preferable to be as short as possible, it is preferable that the insertion bit (x) is the complement of just previous one bit.

Figure 8:
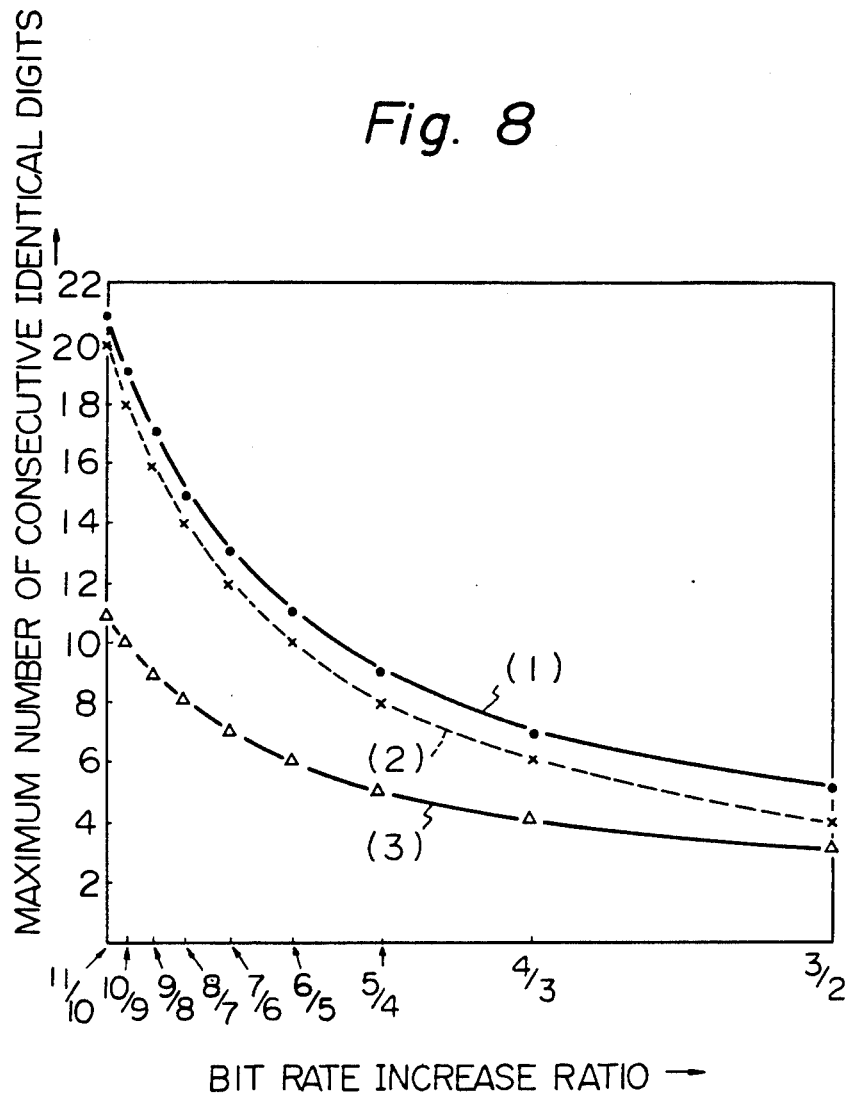
FIG. 8 shows curves for showing the effect of the present invention.

FIG. 8 shows calculated curves between the bit rate increase ratio (horizontal axis) and the maximum number of the consecutive identical digit (vertical axis). Of course, it is preferable that the maximum number is as small as possible for each bit rate increase ratio. The curve (1) in that figure shows the characteristics of a prior system shown in FIG. 2, the curve (2) concerns the prior system shown in FIG. 3, and the curve (3) shows the characteristics of the present system shown in FIGS. 4 through 7. It is apparent from that figure that the present system is excellent for reducing the maximum number of the consecutive identical digit for each bit rate increase ratio.

As described above, the present invention has the effects listed below.

(1) The maximum number of the consecutive identical digit is only $m+1$, when an insertion pulse is inserted for every m bits. That value $m+1$ is considerably small as compared with that of a prior system. In other words, the bit rate increase ratio for providing the desired maximum number of the consecutive identical digit is smaller than that of prior systems. Then, the high bit rate digital transmission is possible by using the present invention. Further, according to the present invention, the structure of a repeater and/or a terminal equipment can be simple.

(2) The structure of a coder and/or a decoder of FIG. 5 and FIG. 6 is simpler than that of a prior art.

(3) Any desired bit rate increase ratio is obtained by designing the value m.

(4) No static pattern jitter occurs as a complement code which is not fixed is inserted.

(5) A transmission error does not increase in an encoding and/or a decoding procedure.

Figure 9:
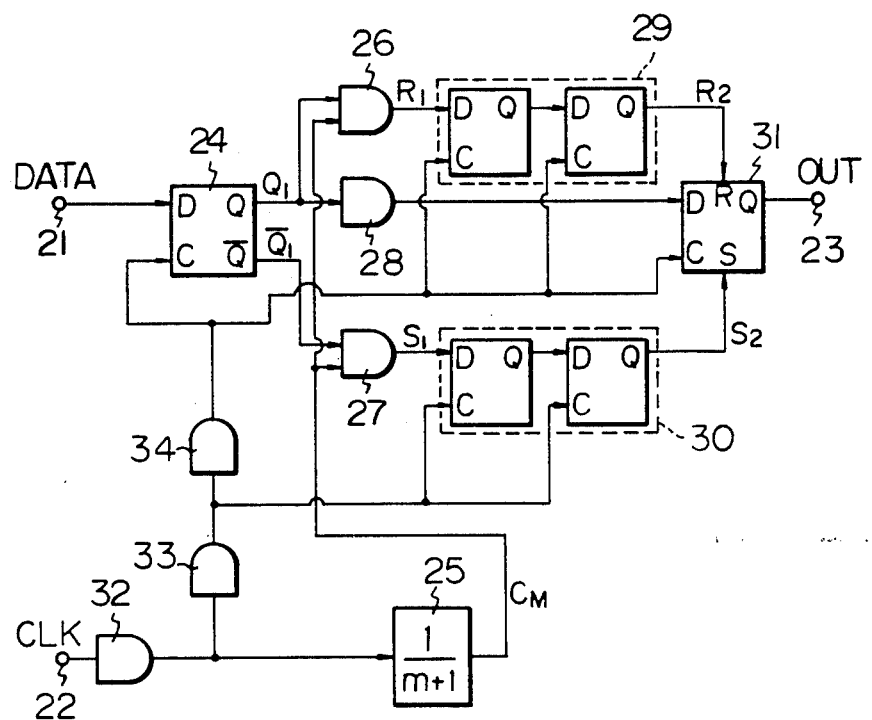
FIG. 9 is a block diagram of the second embodiment of the encoder of the maximum consecutive identical digit suppression system according to the present invention.

FIG. 9 is a block diagram of another encoder according to the present invention for implementing the operation of FIG. 4, in which a complement pulse of the just previous one bit is inserted for every 10 input pulses (m=10), then the bit rate increase ration is $(m+1)/m=11/10$. In FIG. 9, the reference numeral 21 is a first input terminal for receiving input data, 22 is a second input terminal for receiving a clock pulse, 23 is an output terminal for providing encoded output data, 24 is a shift register having one bit position or a flip-flop, 25 is a frequency divider for providing $1/(m+1)$ frequency of the input frequency of the clock pulse, 26 is an AND circuit for providing a reset pulse, 27 is an AND circuit for providing a set pulse, 28 is a gate circuit for adjusting the phase of a signal, 29 and 30 are shift registers each having two bit positions, 31 is a flip-flop for inserting a complement code, 32, 33 and 34 are gate circuits. The flip-flops in the circuit of FIG. 9 are implemented by a D-type master-slave flip-flop.

It is assumed that an input signal applied to the first input terminal 21 has a dummy bit for every $m+1$ bits, and the block synchronization is accomplished, so that a complement pulse can substitute to that dummy bit. In other words, a bit rate of an input signal applied to the first input terminal is increased already in the preceeding stage (not shown), and the circuit of FIG. 9 is initialized to clear all the flip-flops before an input signal and a clock signal are applied to the circuit of FIG. 9.

Figure 10:
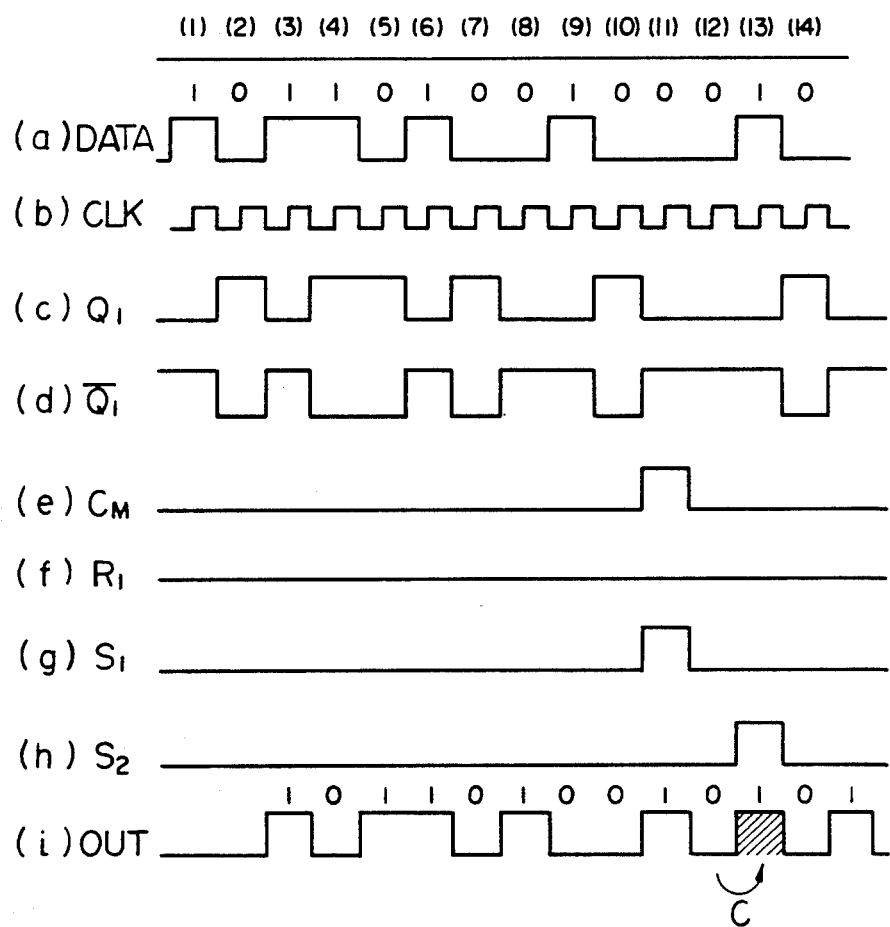
FIG. 10 shows the operational signal sequence of the circuit of FIG. 9.

The operation of the circuit of FIG. 9 is shown in FIG. 10. It is assumed that the input signal shown in FIG. 10(a) is applied to the input terminal 21, and the clock pulse as shown in FIG. 10(b) is applied to the terminal 22. The figures ((1), (2), (3), et al) at the top of FIG. 10 show the sequence of the input data. Then, the flip-flop 24 provides a pair of outputs $Q_1$ which is shown in FIG. 10(c) and the output $\overline{Q}_1$ which is shown in FIG. 10(d). The outputs of that flip-flop 24 are synchronized with the clock pulse of FIG. 10(b). The divider 25 provides the divided pulse $C_M$ as shown in FIG. 10(e). The pulse train $C_M$ has the period $(m+1)T_0$ where $T_0$ is the period of the clock pulse train, and m is an integer to define the insertion period of an insertion pulse. The AND circuits 26 and 27 provide a reset pulse $R_1$ and a set pulse $S_1$ by providing the logical product of the pulse $C_M$ and the output $Q_1$ and $\overline{Q}_1$, respectively, as shown in FIGS. 10(f) and 10(g). That is to say, when the m'th bit of the input data is "1" a reset pulse $R_1$ is generated, and when m'th bit of the input data is "0" a set pulse $S_1$ is generated. A set pulse $S_1$ and a reset pulse $R_1$ are delayed by two bit positions in the shift registers 29 and 30 which provide the delayed pulses $S_2$ and $R_2$, respectively, in order to insert that set pulse or reset pulse in the $(m+1)$'th bit position. The output of the shift register 30 is shown in FIG. 10(h). Then, the flip-flop 31 which receives an input data from the AND circuit 28 which compensates the delay time in the shift registers 29 and 30, provide the output pulse as shown in FIG. 10(i), in which every $(m+1)$'th bit is set or reset by the outputs of the AND circuits 27 or 26.

The circuit of FIG. 9 restricts the maximum number of consecutive identical digits to $(m+1)$ bits.

The embodiment of FIG. 9 shows that a complement digit of every m'th bit is inserted in $(m+1)$'th bit position. When the flip-flop 24 is substituted by a shift register with k bit positions (k=2, 3, ..., m), and the shift registers 29 and 30 have $(k+1)$ bit positions, a complement of a digit of previous $k-1$ bit positions can be inserted in the $(m+1)$'th bit position.

Figure 11A:
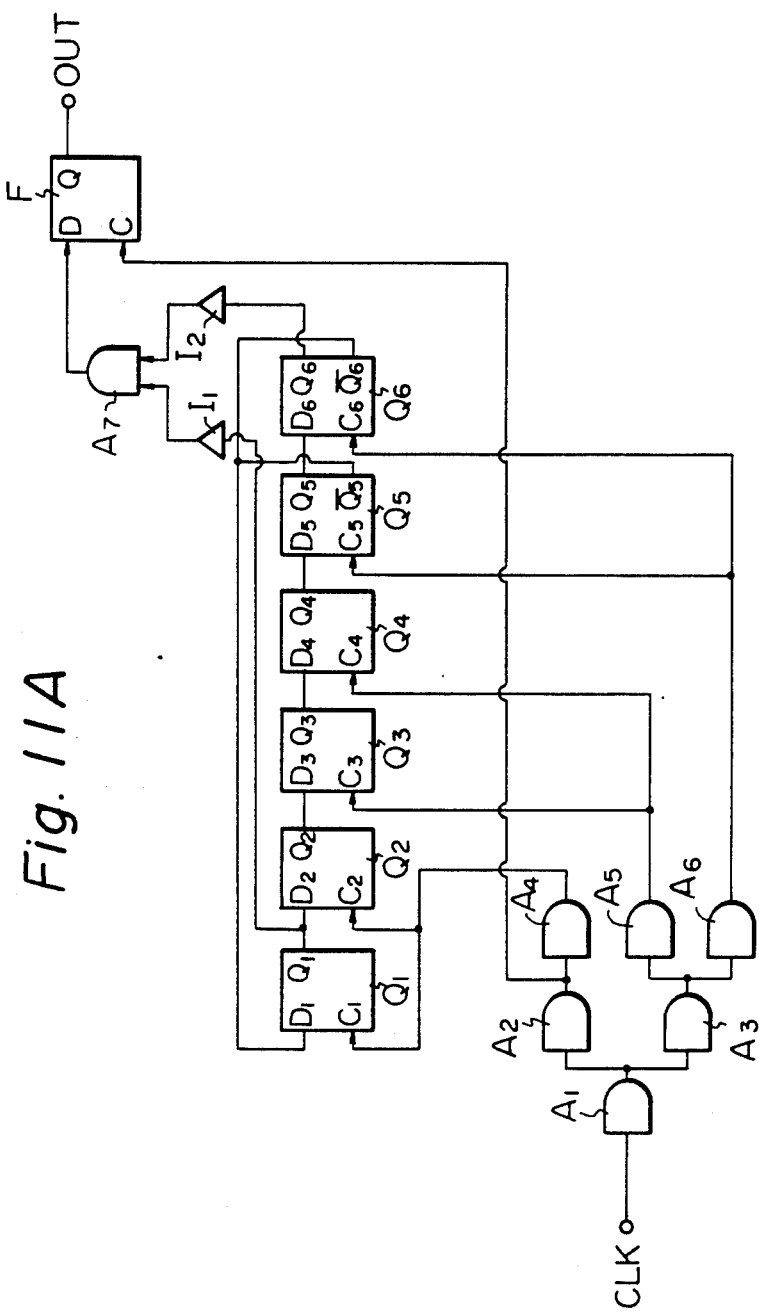
FIG. 11A is a detailed block diagram of the frequency divider in FIG. 9.

FIG. 11A shows a block diagram of a divider 25 of FIG. 9. In this embodiment, the divider provides 1/11 (m=10) of frequency, and in the figure, the symbols $Q_1$ through $Q_6$ are flip-flops, $A_1$ through $A_7$ are AND circuits, $I_1$ and $I_2$ are inverters, and F is a flip-flop. A clock signal applied to the input terminal CLK is divided to 1/11 of frequency and the output is provided on the terminal OUT.

FIG. 11B shows the operation of the circuit of FIG. 11A by showing the outputs of the flip-flops $Q_1$ through $Q_6$ and the output signal at the terminal OUT for every clock timing.

Figure 12:
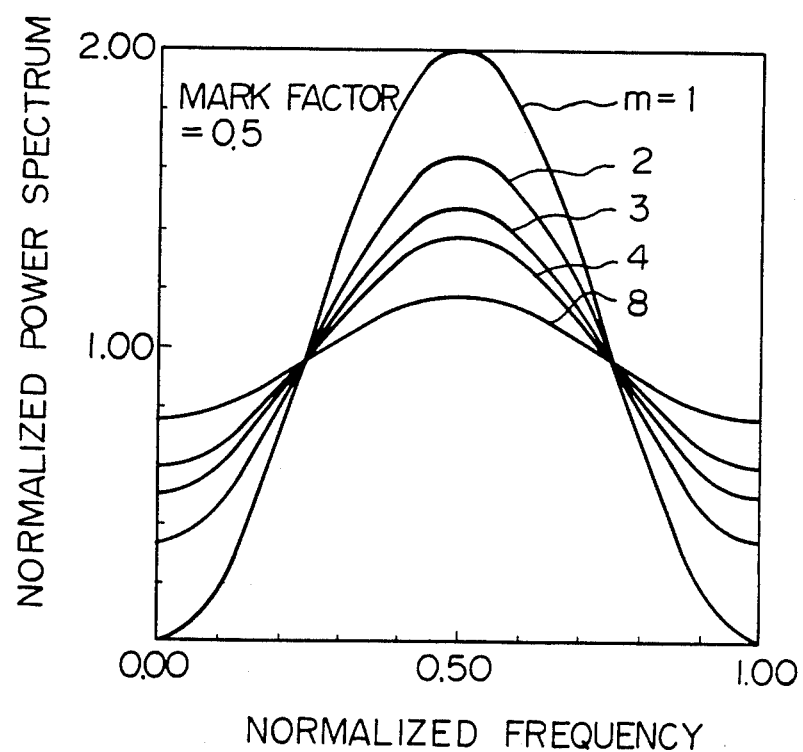
FIG. 12 shows the curves showing the effect of the present invention.

FIG. 12 shows the calculated curves of the power spectrum for each value of m, in which the horizontal axis shows the normalized frequency which is the quotient that an input pulse train is divided by a clock pulse frequency, and the vertical axis shows the normalized power spectrum.

Figure 13:
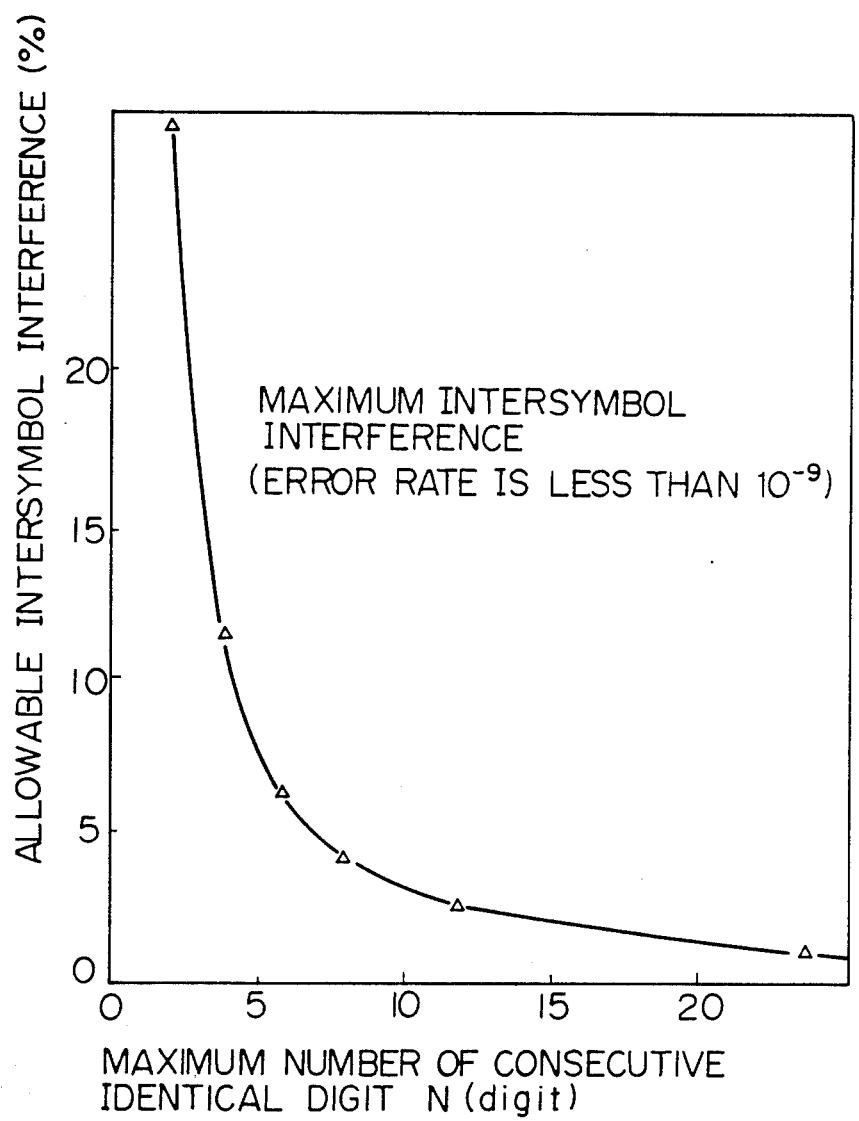
FIG. 13 shows the curve showing the effect of the present invention.

FIG. 13 shows the effect of the present invention by showing the experimental curve of the allowable intersymbol interference (%) for each maximum number of consecutive identical digits in an optical repeater for 400 MHz. The curve of FIG. 13 is obtained by applying an external interference for each maximum number of consecutive identical digits so that an error rate becomes $10^{-9}$, and that external interference at that error rate is measured. When no consecutive identical digit suppressor is used, the consecutive identical digit longer than 24 digits occurs frequently. When that consecutive identical digit is limited to 10 digits by using the present invention, the allowable intersymbol interference increases by 4%. The preferable intersymbol interference is 2.5% in an optical repeater in view of a jitter and/or a level fluctuation of a recognition level. Therefore, the present invention which restricts the maximum number of consecutive identical digits can provide the sufficient improvement for intersymbol interference, and the stable operation of an optical repeater for high bit rate digital communication.

Figure 14:
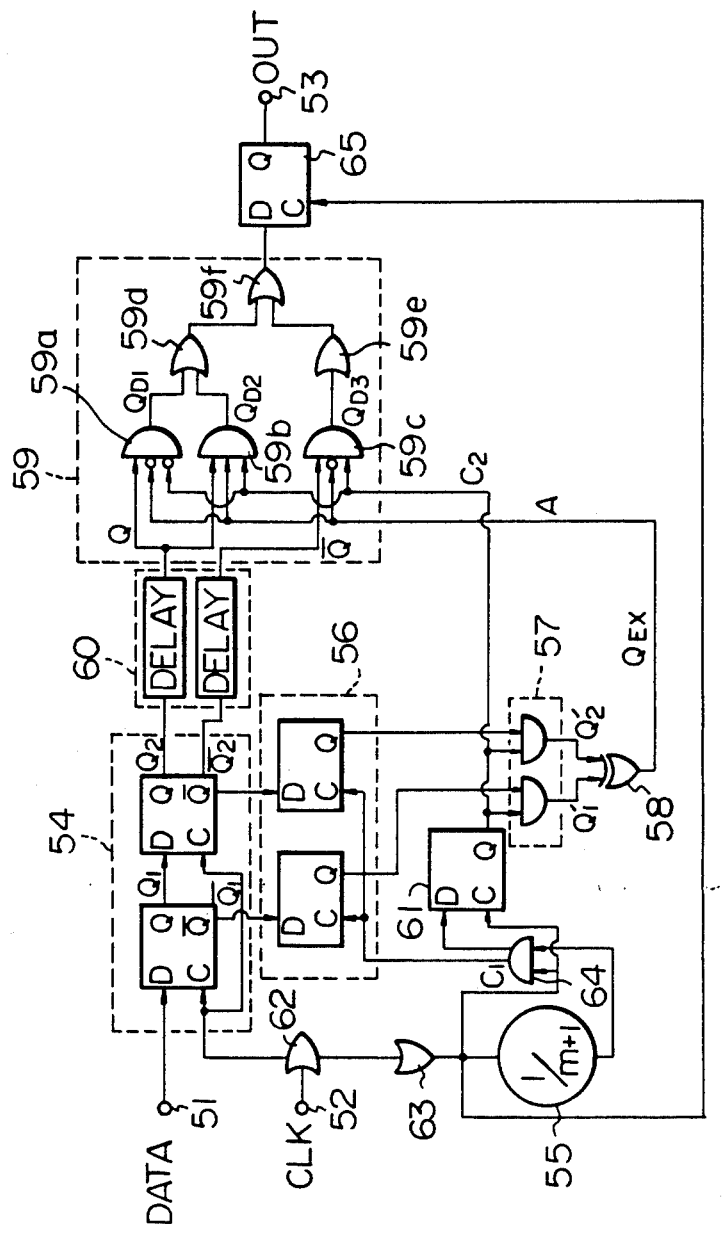
FIG. 14 is a block diagram of the third embodiment of the encoder according to the present invention.

FIG. 14 shows a block diagram of another embodiment of the present invention, in which a complement pulse of just previous one bit is inserted for every 10 input bits (m=10). The bit rate increase ratio is 11/10. In the figure, the reference numeral 51 is a first signal input terminal, 52 is a second clock input terminal, 53 is a signal output terminal, 54 is a shift register with two bit positions, 55 is a frequency divider which provides $1/(m+1)$ frequency of an input clock frequency, 56 is a position indicator for indicating the bit position that a complement pulse is inserted, 57 is a complement pulse generator, 58 is an exclusive-OR circuit, 59 is a complement pulse insertion circuit, 60 is a delay circuit, 61 is a flip-flop, 62 and 63 are gate circuits, 64 is an AND circuit, and 65 is a flip-flop. A flip-flop in FIG. 14 is implemented by a D-type master-slave type flip-flop. The circuit of FIG. 14 inserts a complement pulse for every 10 digits (m=10), so that an inserted pulse is a complement of a just previous pulse.

It is supposed that an input signal at the terminal 51 is already increased a bit rate, by inserting a dummy bit for every 10 bit, and the block synchronization is accomplished, that is to say, the circuit is initialized before an input signal and a clock signal are applied to the circuit. That dummy bit may either be "1" or "0", and a dummy bit is substituted by a complement of a just previous bit of the dummy bit position by the present circuit.

Figure 15:
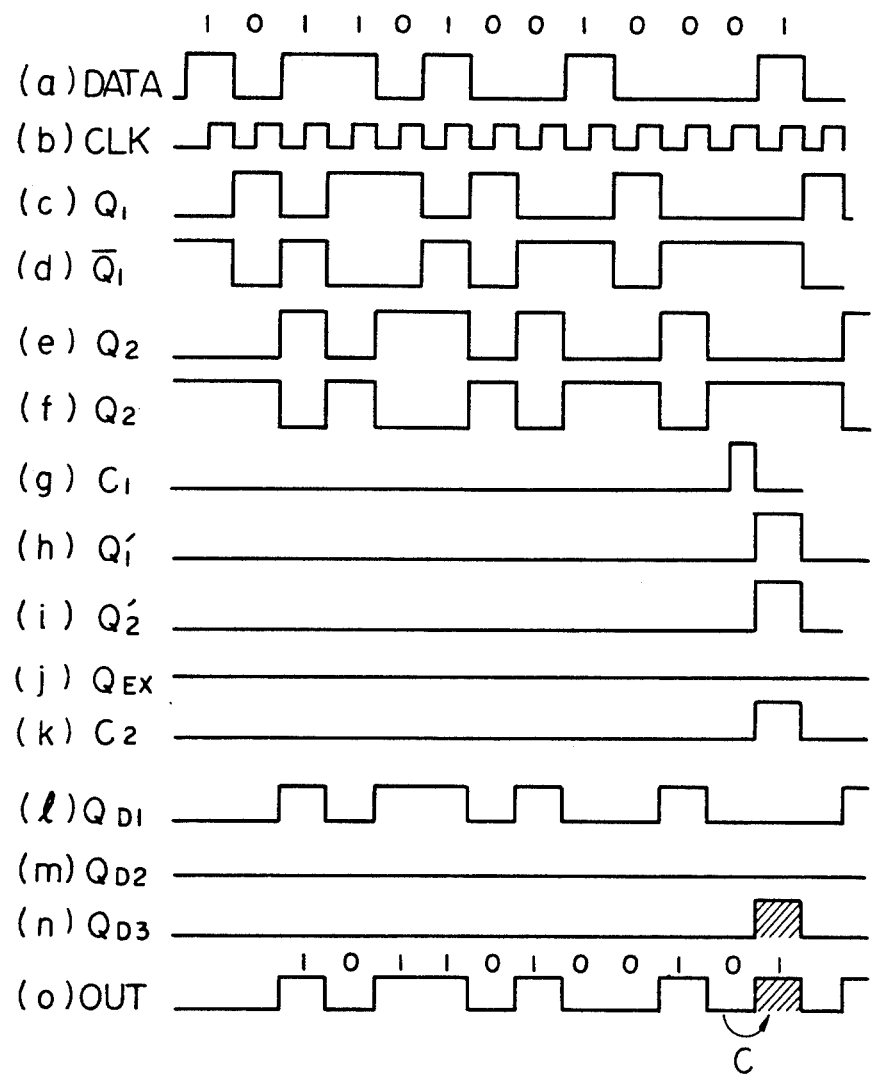
FIG. 15 shows the operational signal sequence of the circuit of FIG. 14.

It is assumed that an input signal shown in FIG. 15(a) is applied to an input terminal 51, and a clock pulse of FIG. 15(b) is applied to the clock input terminal 52. The shift register 54 shifts the input signal by two digits, and provides the output $Q_1$ (FIG. 15(c)), the output $\overline{Q}_1$ (FIG. 15(d)), the output $Q_2$ (FIG. 15(e)), and the output $\overline{Q}_2$ (FIG. 15(f)). The position indicator 56 synchronizes those outputs $\overline{Q}_1$ and $\overline{Q}_2$ with the output pulse $C_1$ (FIG. 15(g)) of the AND circuit 64, which provides the divided frequency pulse $(1/(m+1), m=10)$. The complement pulse generator 57 performs the logical product of the pulse signal $C_1$ which is applied to the circuit 57 through the flip-flop 61, and the signals $\overline{Q}_1$ and $\overline{Q}_2$ which is applied to the circuit 57 through the circuit 56. The outputs $Q_1'$ and $Q_2'$ of the circuit 57 have only a single active pulse for every m+1 clock durations as shown in FIG. 15(h) and FIG. 15(i). The exclusive-OR circuit 58 performs the exclusive-OR operation between the signal $Q_1'$ and the signal $Q_2'$, and the output $Q_{EX}$ of the exclusive-OR circuit 58 is "0" when the m'th bit is identical with the $(m+1)$'th bit (m'bit is 0 and $(m+1)$'th bit is 0, or m'th bit is 1 and $(m+1)$'th bit is 1), and that output $Q_{EX}$ is "1" when the m'th bit is different from the $(m+1)$'th bit, as shown in FIG. 15(j). The signal $Q_{EX}$ switches the outputs $Q_2$ and $\overline{Q}_2$ in the complement pulse insertion circuit 59, which has three AND circuits 59a, 59b and 59c, and three OR circuits 59d, 59e and 59f, in order to select the sign of the pulse at the (m+1)'th bit position.

The AND circuit 59a passes the signal Q which is the delayed signal of the signal $Q_2$ as it is during the first timing through the m'th timing in which $C_1$ is 0 and $Q_{EX}$ is zero, as shown in FIG. 15(l). At the (m+1)'th timing in which $C_1$ is "1", the AND circuit 59b passes the signal Q if $Q_{EX}$ is "1", and the AND circuit 59c passes the signal $\overline{Q}$ which is the delayed signal of the signal $\overline{Q}_2$ if $Q_{EX}$ is "0", as shown in FIG. 15(m) and FIG. 15(n), respectively. The outputs $Q_{D1}$, $Q_{D2}$ and $Q_{D3}$ of the AND circuits 59a, 59b and 59c are combined by the OR circuits 59d, 59e and 59f, then, the combined signal is wave-shaped by the flip-flop 65 to provide the output signal as shown in FIG. 15(o). Accordingly, the sign of a pulse to be inserted is given by the equation below.

$$Q\overline{AC_2} + QAC_2 + \overline{QA}C_2$$

The delay circuit 60 in FIG. 14 delays the outputs $Q_2$ and $\overline{Q}_2$ of the circuit 54 by the time that the circuits 57, 58, 61 and 64 operate.

Accordingly, in the circuit of FIG. 14, the maximum number of consecutive identical digits is m+1.

If k number of shift registers 54 are utilized in a cascade connection instead of two shift registers, then, the (m+1)'bit can be the complement of the previous k−1 bits (k=2, 3, 4, ... ).

Figure 16:
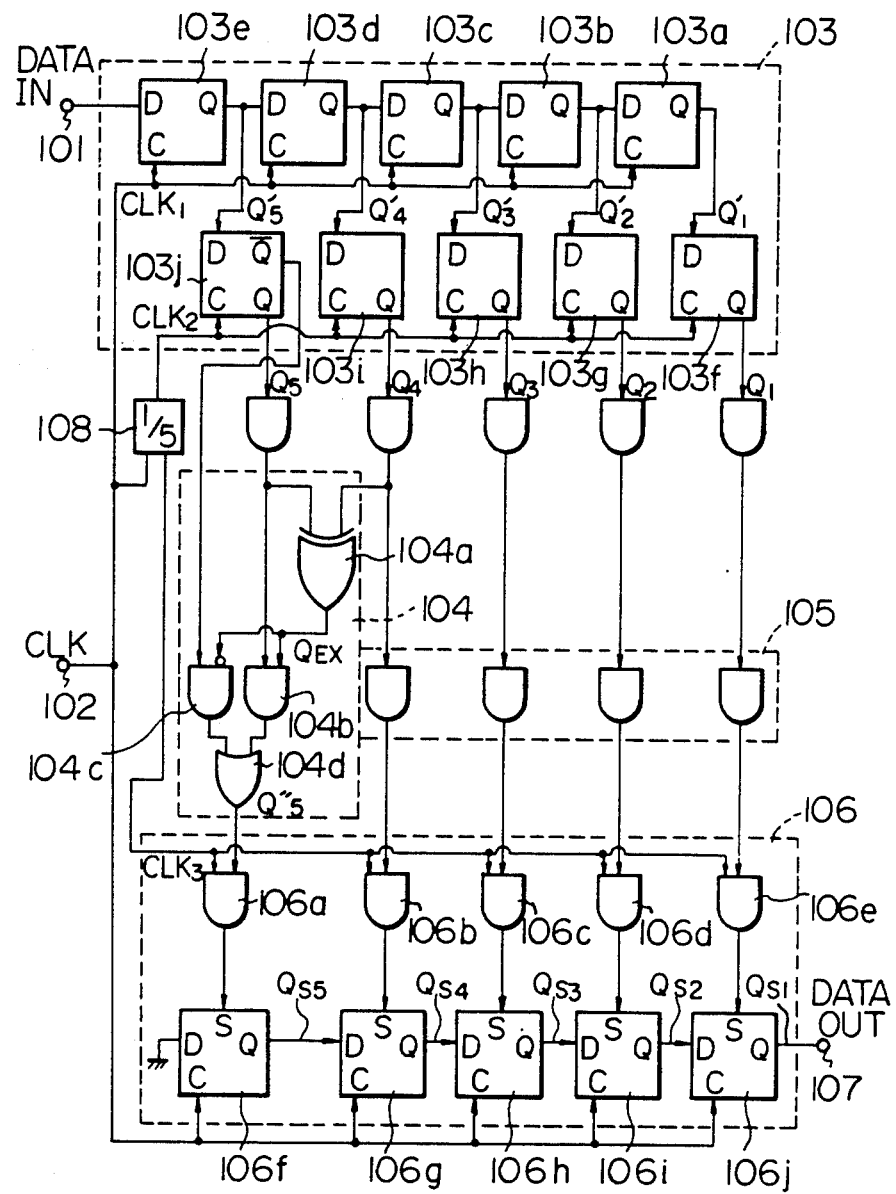
FIG. 16 is a block diagram of the fourth embodiment of the encoder according to the present invention.

FIG. 16 is a block diagram of another embodiment of the present invention. This embodiment inserts a complement digit of the just previous one bit for every 4 digits (m=4) and the bit rate increase ratio is 5/4. In the figure, the reference numeral 101 is a first signal input terminal, 102 is a second clock input terminal, 103 is a serial-parallel converter, 104 is a complement generator, 105 is a gate circuit for adjusting a signal phase, 106 is a parallel-serial converter, 107 is an output terminal, and 108 is a frequency divider for operating a serial-parallel converter and a parallel-serial converter. In the figure, a flip-flop is a D-type master-slave type flip-flop.

It is assumed that an input signal on the terminal 101 has a dummy bit for every 5 bits, and a block synchronization is accomplished, that is to say, the circuit is initialized before an input signal and a clock signal are applied to the circuit. And said dummy bit is substituted by a complement of just previous one bit by the present circuit.

Figure 17:
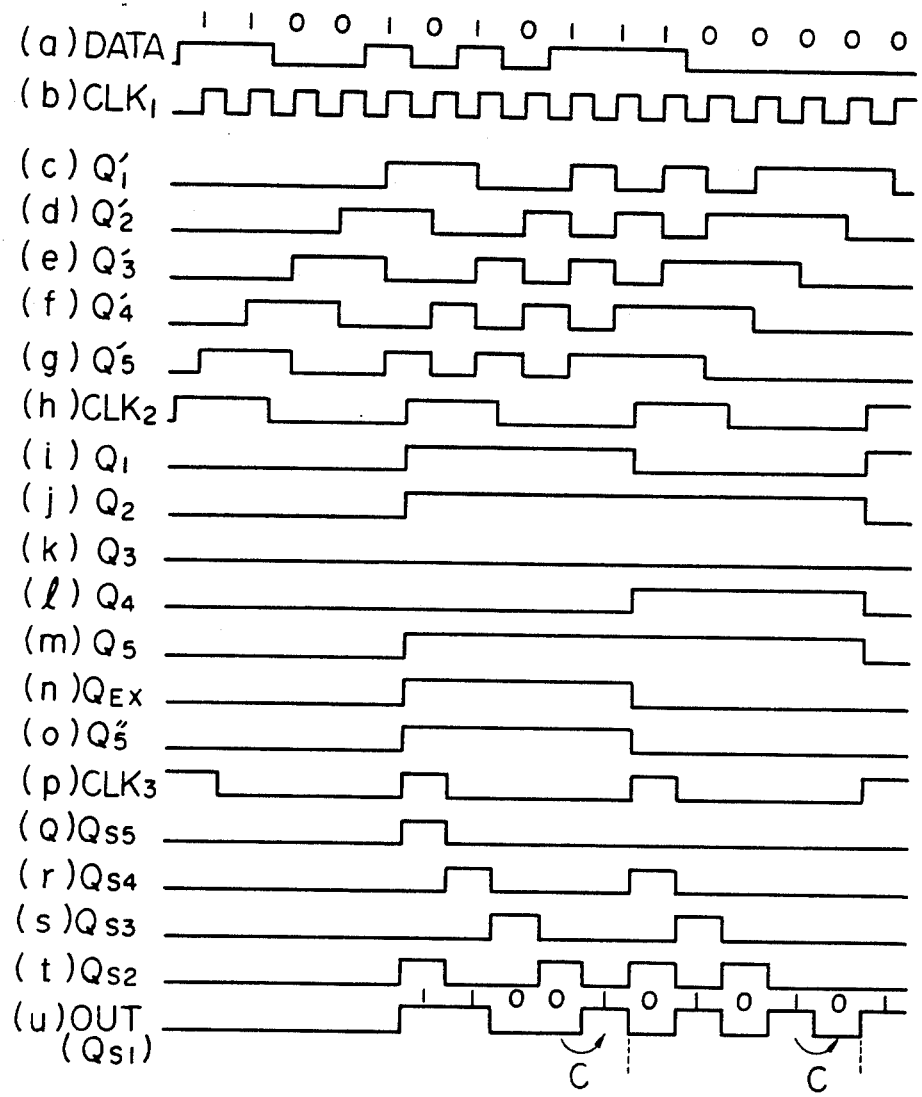
FIG. 17 shows the operational signal sequence of the circuit of FIG. 16.

It is assumed that an input signal shown in FIG. 17(a) is applied to the input terminal 101, and a clock signal of FIG. 17(b) is applied to the clock input terminal 102. Then the flip-flops 103a through 103e provide the output signals $Q_1'$ through $Q_5'$ as shown in FIGS. 17(c) through 17(g), so that each of those signals $Q_1'$ through $Q_5'$ are delayed by one bit time with one another. Those signals $Q_1'$ through $Q_5'$ are synchronized with the output $CLK_2$ which is the output of the pulse divider 108. The pulse divider 108 provides an output pulse for every five clock pulses. Thus, the synchronized outputs $Q_1$ through $Q_5$ from the flip-flops 103f through 103j are shown in FIGS. 17(i) through 17(m) in a parallel form. An exclusive-OR circuit 104a in the complement generator 104 performs the exclusive-OR operation between the signals $Q_4$ and $Q_5$, and provides the result $Q_{EX}$ as shown in FIG. 17(n). The AND circuits 104b and 104c and the OR circuit 104d provide the output signal $Q_5''$ as shown in FIG. 17(o) so that $Q_5''$ is equal to $Q_5$ itself when $Q_{EX}$ is "1", and $Q_5''$ is the complement of $Q_5$ when $Q_{EX}$ is "0". The AND circuits 106a through 106e receive a pulse $CLK_3$ as shown in FIG. 17(p). The pulse width of the signal $CLK_3$ is the same as that of the original input signal, and the frequency of the signal $CLK_3$ is 1/(m+1) of the clock signal. Therefore, those AND circuits 106a through 106e restrict the pulse width of the signals $Q_5''$, $Q_4$, $Q_3$, $Q_2$, and $Q_1$, respectively. The outputs of those AND circuits 106a through 106e are applied to the flip-flops 106a through 106j for the purpose of parallel-serial conversion. The outputs $Q_{s5}$, $Q_{s4}$, $Q_{s3}$, $Q_{s2}$, and $Q_{s1}$ of those flip-flops are shown in FIGS. 17(q) through 17(u). At the final output $Q_{s1}$ of the flip-flop 106j, a dummy bit at every 5'th bit position is substituted by the complement of every 4'th bit as shown in FIG. 17(u), and that $Q_{s1}$ is applied to the output terminal 107 as the output signal.

Accordingly, in the circuit of FIG. 16, the number of the consecutive identical digits is equal to or less than 5 (m=4). FIG. 18 shows a block diagram of the 1/5 pulse divider 108, which has three flip-flops 108a through 108c, and an AND circuit 108d.

In the above embodiments, the present circuit can be implemented by using conventional IC (integrated circuit) available in a market. For instance, μPB 661B Dual 4 input OR/NOR gate, μPB 662B Quad 2 inputs NOR gate, and μPB 636B D-type master-slave flip-flop, all manufactured by Nippon Electric Company, Ltd. (NEC) in Japan, are the examples for implementing the circuits of the present invention.

From the foregoing it will now be apparent that a new and improved consecutive identical digits suppression system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A consecutive identical digit suppression bit insertion system in a digital communication system comprising;

an input terminal for receiving an input signal,
    rate converting means coupled to the input terminal for converting the transmission bit rate of the input signal to (m+1)/m times the rate of the input signal where m is the integer number of input bits between insertion bits,
    means coupled to the converting means for receiving the converted signal and inserting an additional bit after the $m^{th}$ bit, the insertion bit comprising the complement of the $k^{th}$ bit previous to the insertion bit where k is an integer satisfying 1 < k < m and the insertion bit has the same bit rate as the m converted bits, and
    an output terminal coupled to the inserting means for providing an encoded signal with m bits of input signal and one inserted bit.

2. A consecutive identical digit suppression system according to claim 1, wherein the value k is 1.

3. A consecutive identical digit suppression system according to claim 1, wherein the value of m is less than 12.

4. A consecutive identical digit suppression system in a digital communication system comprising:

(a) a first input terminal for receiving input digital data which data has a dummy bit position every m bits where m is an integer and the dummy bit reserves the bit position for an insertion bit, (b) a second input terminal for receiving a clock signal having the same bit rate as the bit rate of the input digital data, (c) an output terminal for providing encoded output data, (d) first shift register means coupled to the first and second input terminals for receiving and shifting each bit of the input digital data through k bit positions where k is an integer and for providing register outputs Q and $\overline{Q}$, where Q has the value of that input bit which has been shifted entirely through the k positions of the shift register and $\overline{Q}$ is a complement of Q, (e) a divider coupled to said second input terminal for dividing said clock signal and thereby providing a divided pulse $C_M$ having a period (m+1) times the period of said clock signal, (f) first and second AND circuit means coupled to said pulse $C_M$ wherein the first AND means is also coupled to said output Q for providing an output $R_1 = QC_M$ and the second AND means is coupled to said output $\overline{Q}$ for providing an output $S_1 = \overline{Q}C_M$, (g) second and third shift register means coupled to said first and second AND circuit means for shifting the outputs ($S_1$, and $R_1$) of said AND circuit means by (k+1) bit positions to provide the outputs $S_2$ and $R_2$ from the inputs $S_1$ and $R_1$ respectively, and (h) a flip-flop, which is clocked according to said received clock signal, switched according to said output Q, set by the signal $S_2$, and reset by the signal $R_2$ to provide an output signal to said output terminal, so that a complement of $k^{th}$ bit previous to said dummy bit position is inserted in said dummy bit position in the input data wherein the output of said flip-flop is applied to said output terminal.

5. A consecutive identical digit suppression system according to claim 4, wherein said value of k is 1.

6. A consecutive identical digit suppression system in a digital communication system comprising:

(a) a first input terminal for receiving input digital data which data has a dummy bit position every m bits where m is an integer and the dummy bit reserves the bit position for an insertion bit, (b) a second input terminal for receiving a clock signal having the same bit rate as the bit rate of the input digital data, (c) an output terminal for providing encoded output data, (d) shift register means coupled to the first input terminal for receiving and delaying the input signal by k+1 bit positions and providing an output signal $Q_2$ and an output signal $Q_1$ which is k bits previous to said $Q_2$, (e) a pulse divider coupled to the second input terminal for providing an output pulse $C_1$ which has a period m+1 times the period of said clock signal, (f) an exclusive-OR circuit means for providing an output A which is an exclusive-OR output between said $Q_2$ and $Q_1$ at the timing that said output $C_1$ of said pulse divider exists, (g) delay means coupled to said shift register means for delaying the output of said shift register means to provide an output Q wherein Q is a delayed representation of said $Q_2$, and (h) logic means for providing a signal satisfying $$Q\overline{AC_2} + QAC_2 + \overline{QA}C_2$$

so that a complement of $k^{th}$ bit previous to the dummy bit position is inserted for every m bit positions of input data to provide output to said output terminal.

7. A consecutive identical digit suppression system according to claim 6, wherein the value k is 1.

8. A consecutive identical digit suppression system in a digital communication system comprising:

(a) a first input terminal for receiving an input signal having a dummy bit position for every m bits where m is an integer and the dummy bit reserves the bit position for an insertion bit, (b) a second input terminal for receiving a clock signal having the same bit rate as the bit rate of the input signal, (c) an output terminal for providing encoded output data, (d) a serial-parallel converter coupled to said first and second input terminals for receiving and converting a serial signal on said input terminal to a parallel signal, (e) a complement generator having an exclusive-OR circuit for providing an exclusive-OR logic between the m'th output of said serial-parallel converter and k'th output of said serial-parallel converter thereby providing an exclusive-OR output signal $Q_{EX}$, where m is an integer and k is an integer satisfying $1 \leq k \leq m-1$, (f) a logic circuit for switching the m'th output of said serial-parallel converter according to the exclusive-OR output signal $Q_{EX}$ of said exclusive-OR circuit, and (g) a parallel-serial converter receiving the first through the m'th outputs of said serial-parallel converter, and the output of said logic circuit to convert those input signals to a serial form to provide an output signal to said output terminal.

9. A consecutive identical digit suppression system according to claim 8, wherein the value k is 1.

* * * * *